(12) United States Patent
Tamosaitis

(10) Patent No.: US 7,580,234 B2
(45) Date of Patent: Aug. 25, 2009

(54) SINGLE THRESHOLD CURRENT SURGE LIMITER CIRCUIT WITH DISABLE FUNCTION

(75) Inventor: Anthony Tamosaitis, Carol Stream, IL (US)

(73) Assignee: Honeywell International Inc., Morristown, NJ (US)

( * ) Notice: Subject to any disclaimer, the term of this patent is extended or adjusted under 35 U.S.C. 154(b) by 443 days.

(21) Appl. No.: 11/038,727

(22) Filed: Jan. 20, 2005

(65) Prior Publication Data

US 2006/0158810 A1    Jul. 20, 2006

(51) Int. Cl.
*H02H 9/08* (2006.01)
(52) U.S. Cl. ...................................... 361/93.9
(58) Field of Classification Search ................. 361/93.9
See application file for complete search history.

(56) References Cited

U.S. PATENT DOCUMENTS

| 4,396,882 | A | * | 8/1983 | Kellenbenz | 323/278 |
|---|---|---|---|---|---|
| 5,121,033 | A |   | 6/1992 | Kosich | |
| 5,673,030 | A | * | 9/1997 | Kosich | 340/635 |
| 5,930,130 | A | * | 7/1999 | Katyl et al. | 363/53 |
| 6,163,712 | A | * | 12/2000 | Winkler et al. | 455/572 |
| 6,184,669 | B1 | * | 2/2001 | Matsuo | 323/303 |
| 6,311,021 | B1 | * | 10/2001 | Kosich | 396/164 |
| 6,570,369 | B2 | * | 5/2003 | Tamai et al. | 323/288 |
| 6,661,337 | B2 |   | 12/2003 | Ha et al. | 340/293 |
| 6,828,803 | B2 |   | 12/2004 | Ichimasa | |
| 2002/0080544 | A1 | * | 6/2002 | Pellegrino | 361/93.9 |
| 2004/0251851 | A1 | * | 12/2004 | Maishima | 315/244 |
| 2005/0035851 | A1 |   | 2/2005 | Keeney | |
| 2005/0104739 | A1 |   | 5/2005 | Fisler | |

* cited by examiner

*Primary Examiner*—Stephen W Jackson
*Assistant Examiner*—Ann T Hoang
(74) *Attorney, Agent, or Firm*—Husch Blackwell Sanders Welsh & Katz

(57) ABSTRACT

A circuit which limits current to a first value until a predetermined time has elapsed, then permits the current to rise to a second, acceptable value. The current limiting can be carried out during a predetermined time interval by a biased semiconductor switch. Subsequent to the current limiting time interval, the semiconductor switch can be saturated enabling the current to increase.

7 Claims, 3 Drawing Sheets

SINGLE THRESHOLD CURRENT SURGE LIMITER CIRCUIT WITH DISABLE FUNCTION

FIELD OF THE INVENTION

The invention pertains to current limiting circuits. More particularly, the invention pertains to current limiting circuits which might find applicability in electrical devices where intermittent peak current demands may greatly exceed average current draw.

BACKGROUND

It has been recognized that certain types of electrical devices can have peak current requirements which exceed average current requirements by several orders of magnitude. One form of such device is a strobe unit of the type used to indicate an emergency condition in an alarm system, such as a fire alarm.

FIG. 1 illustrates a known form of strobe unit 10. The strobe unit 10 includes control circuitry 12, which among other functions, manages charging, via circuitry 14, a relatively large electrolytic capacitor 16. Capacitor 16 is used to provide electrical energy to a gas discharge tube 18 which can be selectively triggered. When triggered, the electrical energy previously stored on capacitor 16 is coupled to tube 18 to provide a high intensity visual output indicative of the alarm condition.

When power is initially applied to such units, for example, via lines 22 as would be understood by those of skill in the art, an initial current surge which might have an amplitude as great as 10 amps can be drawn by the device 10. FIG. 2 is an exemplary graph illustrating an initial maximum current surge Io. The initial surge current is primarily due to a need to charge one or more electrolytic capacitors, such as capacitor 16, in strobe unit 10. After the initial current surge has subsided, the device 10 draws a substantially lower current, Irms, which typically depends on the candela output of the device 10. Such currents can fall in the range of less than 50 mA to more than 500 mA.

By design, strobe units, such as the unit 10 flash their respective output device 18 once a second as illustrated in FIG. 2. Each flash produces a substantial repeat current surge, Irep, which, while less than the initial current surge Io, can still be orders of magnitude above the intermittent current demands Irms. Those of skill will understand that the peak current values illustrated in FIG. 2 are exemplary only and could vary between the strobe units depending on their exact design. Nevertheless, in each instance, such units exhibit an initial peak inrush current followed by repetitive, though lower, repeat inrush currents.

It has also been recognized that there is a benefit to incorporating flexibility into strobe units, such as the strobe unit 10 by providing a candela select capability 28 (illustrated in phantom in FIG. 1). This capability can be implemented with jumpers or switches located on the unit 10. This capability enables an installer to select one of a plurality of candela outputs, at installation, and have the benefits of a common product.

The presence of the initial peak current draw and repetitive peak current draws, as illustrated in FIG. 2 is undesirable. It has resulted in the use of current limiting circuitry 30, illustrated in phantom in FIG. 1, in strobe units, such as the unit 10. One such configuration has been disclosed in U.S. patent application Ser. No. 10/040,968 filed Jan. 7, 2002 and entitled "Processor Based Strobe with Feedback", now U.S. Pat. No. 6,661,337. The U.S. Pat. No. 6,661,337 patent is assigned to the Assignee hereof and incorporated by reference herein. While the current limiting circuitry of the subject patent is effective for its intended purpose, it is primarily analog in nature and requires the inclusion of capacitors in the respective strobe units. Capacitors, of course, add both complexity and cost to such products.

There thus is a continuing need for current limiting circuitry which could be incorporated into strobe units, such as the exemplary strobe unit 10, to limit not only the initial peak in rush current but subsequent repetitive peak current values. Preferably, such circuitry could be implemented so as to minimize any additional costs without unduly requiring additional capacitors for the purpose of smoothing, and or limiting the initial peak current as well as repetitive peak current draws. Such circuitry might be useful in connection with other types of devices which draw substantial initial in-rush currents and/or subsequent repetitive peak currents.

DESCRIPTION OF THE PREFERRED EMBODIMENTS

Figure 1:
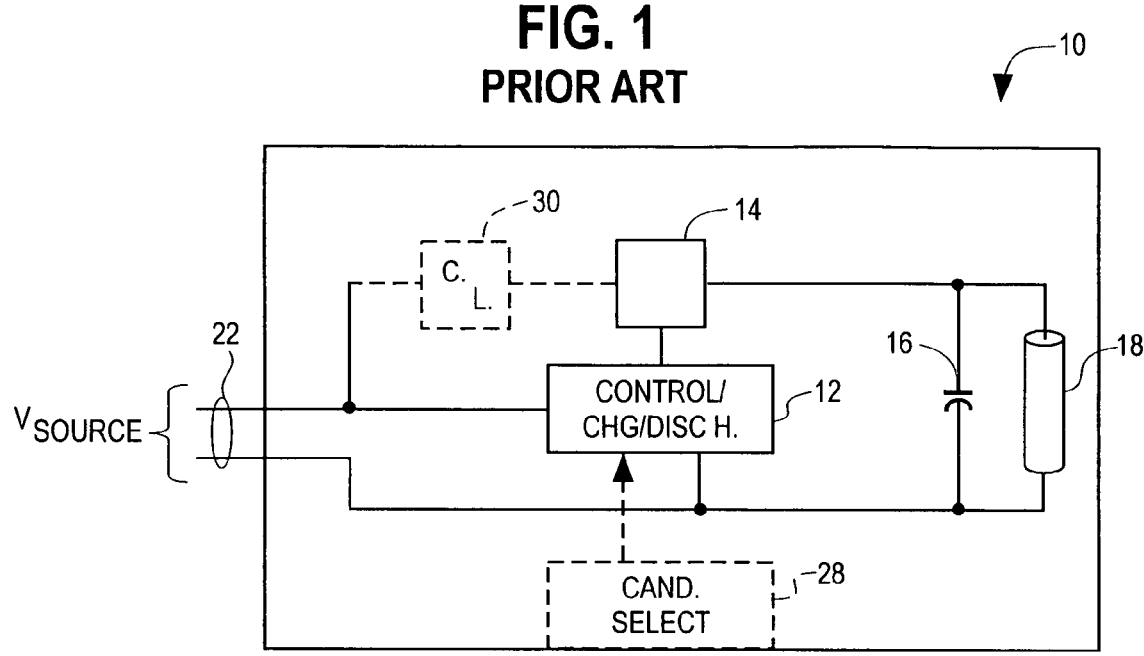
FIG. 1 is a block diagram of an exemplary prior art strobe unit.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

A circuit which embodies the invention includes a current sensor which senses and controls current flow through a current limiting device. In a disclosed embodiment, a current sensing threshold is established which is sufficiently low that it could meet the requirements of the lowest candela setting in a multi-candela strobe unit.

The current limiting device operates to limit current flow for a predetermined time interval before being disabled. The predetermined time interval is selected such that the capacitors of the device are charged to a sufficiently high voltage.

The difference between the voltage across the capacitor(s) and the applied source voltage, which are coupled together through the current limiting device, makes it possible to limit the resulting current surge to an acceptable value. Subsequently, the capacitors of the device can continue to be charged through a low impedance, fully saturated, current limiter. The described embodiment permits higher currents and results in less losses throughout the balance of the charging cycle.

The above-described embodiment is particularly advantageous in that it can be incorporated into a multi-candela output device. Thus, the benefits of multi-candela devices continue to be available to customers who install them. Their visual output levels can continue to be set in the field either manually by the installer, or if desired, downloaded from a remote source. One model, thus can be used to meet a variety of output requirements thereby improving manufacturing efficiency and reducing inventory costs.

Figure 2:
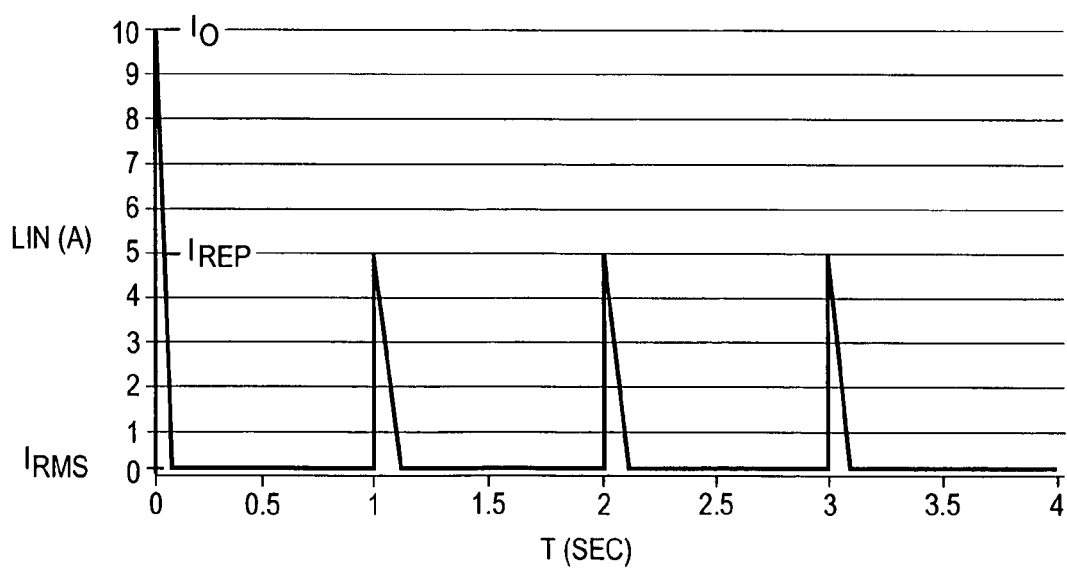
FIG. 2 is a graph of initial peak and repetitive peak currents for strobe units, such as that of FIG. 1.
Figure 3:
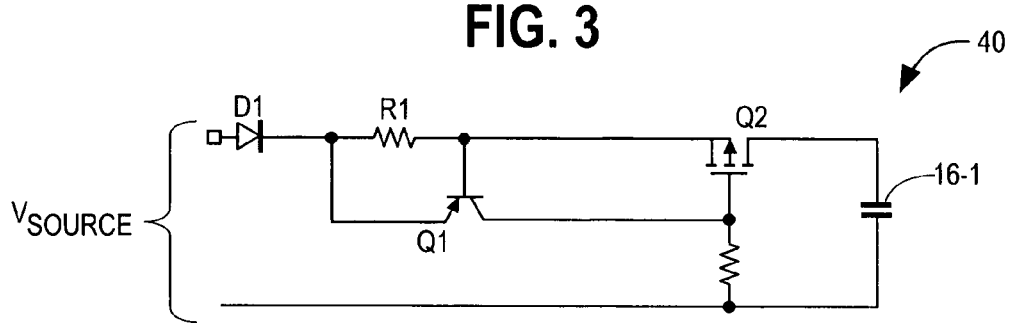
FIG. 3 is one form of a current limiting circuit.

FIG. 3 illustrates a basic form of a current limiting circuit 40. The circuit 40 includes a load capacitor 16-1 which is to be charged to a predetermined voltage. Capacitor 16-1 might, for example, correspond to the capacitor 16 of a strobe unit such as the unit 10 of FIG. 1. Merely coupling Vsource to capacitor 16-1, as would be understood by those of skill in the art, results in undesirable peak current values as illustrated in FIG. 2.

When the applied voltage across R1, from Vsource, approaches 600 mV, transistor Q1 turns on forcing Q2 to partly shut off to start limiting current. Surge current is limited by choosing an appropriate value for resistor R1. As an example, consider a strobe, such as strobe 10 of FIG. 1, that has IRMS=50 mA. R1 could be selected such that the peak current would be limited to less than 250 mA but greater than 50 mA if 50 mA is required to deliver the required candela.

Diode D1 protects the circuit from damage in the event of accidental reverse polarity connection to the power source, Vsource. D1 is not necessary in order for the circuit to function properly if the source polarity is connected correctly.

The circuit 40 of FIG. 3 is not suitable for use in field selectable candela products. In those products, the end user selects a candela setting, and IRMS can vary from 50 to 500 mA, based on the candela selection. There is no single value of R1 that can provide enough current at the highest candela setting without exceeding a maximum surge current at the lowest candela setting.

Figure 4:
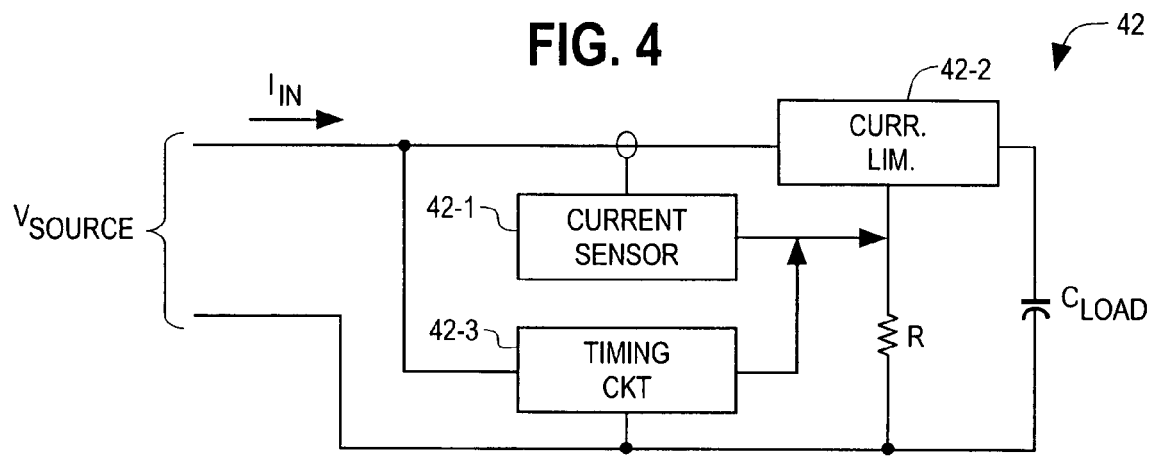
FIG. 4 is a block diagram of a current limiter in accordance with the invention.

FIG. 4 illustrates a current limiting circuit 42 in accordance with the invention. The circuit 42 is advantageous in that it can be used with variable candela strobe units.

The circuit 42 includes a single threshold current sensor 42-1 which is coupled to and which provides control signals to a current limiting switch 42-2. When the source voltage Vsource couples electrical energy to the circuit 42 to charge a load capacitor Cload, current sensor 42-1 responds to the incoming current required to charge the load capacitor.

If the incoming current exceeds a predetermined threshold, the current sensor 42-1 causes the current limiting switch to go from a highly conductive, low impedance, state to a less conductive, higher impedance, state. The peak value of the incoming current Iin can thus be limited as required.

Circuit 42 also includes timing circuitry 42-3 coupled to a control input of the current limiting switch 42-2. After a predetermined interval, the timing circuitry 42-3 disables the current limiting function of the switch 42-2. The current at that point in time increases based on the difference between the value of the source voltage, Vsource, and the voltage across the capacitor Cload and also based on the impedance of the current limiting switch 42-2.

Figure 5:
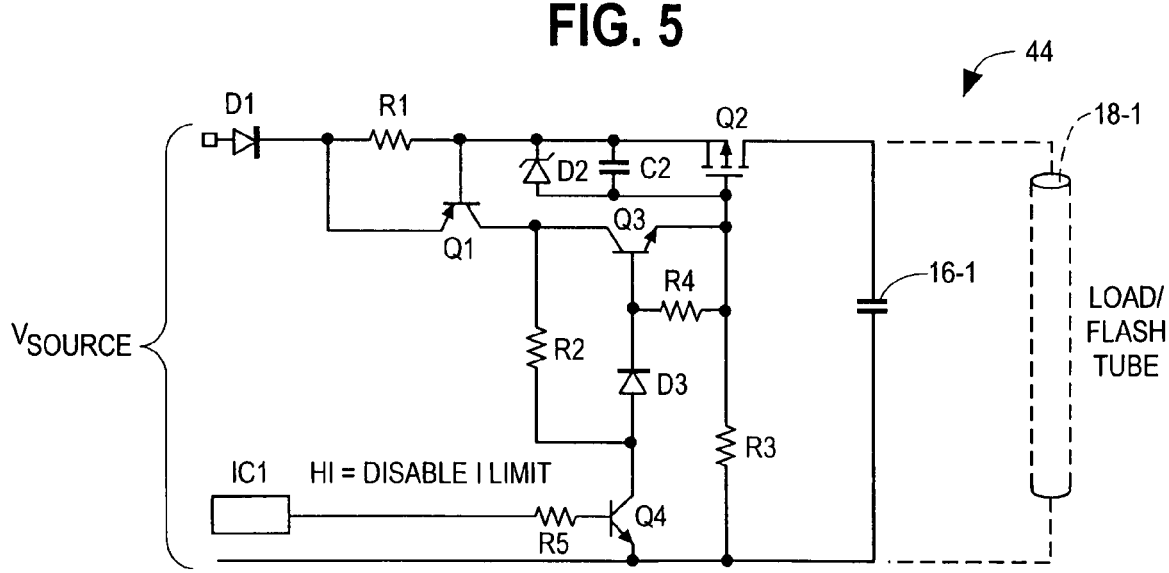
FIG. 5 is a schematic diagram of an exemplary current limiting circuit in accordance with the invention.

In accordance with the invention, circuit 44, illustrated in FIG. 5, operates as a 50 mA current limiter. The circuit of FIG. 4 is more flexible than is the circuit in FIG. 3. Circuit 44 could be used to charge capacitor 16-1 to energize gas tube 18-1 when triggered. The circuit of FIG. 4 has the capability of disabling the current limiting function when the strobe capacitance 16-1 has been sufficiently charged to prevent an unacceptable inrush current surge.

Initially when the voltage across resistor R1 approaches 600 mV, transistor Q1 turns on forcing FET Q2 to operate to start limiting current. R1 is selected such that the inrush current is below a pre-set threshold. For example, resistor R1 can be selected to limit in-rush current to a level acceptable for the lowest candela setting of a field selectable multi-candela strobe.

A timer or microprocessor IC1, controls the amount of time the current limiting function is enabled and then disables current limiting function by turning on Q4. This in turn will cause FET Q2 to conduct heavily. The amount of time the current limiting is enabled ensures that the difference between load capacitance voltage and source voltage, coupled with the impedance between the source and load capacitance 16-1, will not result in an unacceptable current surge, once the current limiting function has been disabled. The strobe capacitor 16-1 can then continue to be charged through a fully saturated current limiting device such as transistor Q2. A single value can now be used for R1 in a multi-candela strobe to provide enough current at the highest candela setting without exceeding a pre-set maximum surge current at the lowest candela setting.

Capacitor C2 has been selected to limit the initial inrush current surge during power up. During power up, IC1 will go through a power up and initialization process before it can take control. As those of skill in the art will recognize, capacitor C2 may not be needed depending upon the characteristics of D2, D3, IC1, Q2, Q3 and Q4. It also may not be needed depending on the values of R2, R3 and R4, the allowable range of input voltages, or the allowable range of candela settings.

Control circuit IC1 can be implemented as a programmed microprocessor. It can also be implemented by various timing devices or similar circuits.

Figure 6:
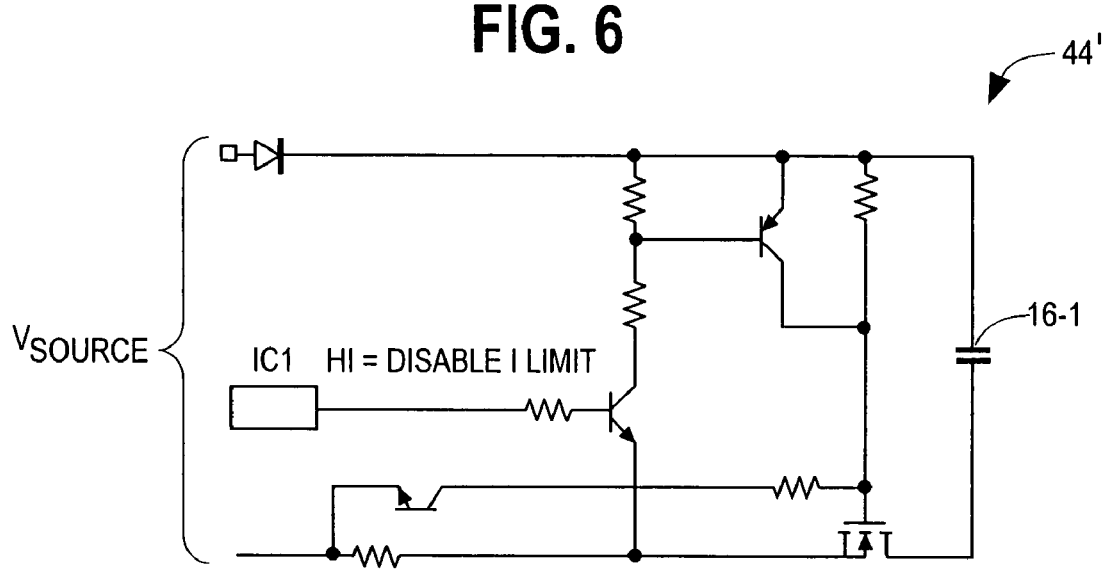
FIG. 6 is a schematic diagram of an alternate embodiment of the current limiter of FIG. 5.

Transistor Q2 is illustrated as a P Channel MOSFET. It can be replaced by other devices. Alternately, a current limiter 44' can be placed in the negative leg of a circuit, see FIG. 6. For example, transistor Q2 can be an N Channel MOSFET located in the negative leg of a corresponding circuit as in FIG. 3. Other circuit implementations come within the spirit and scope of the invention.

Zener D2 protects the transistor Q2 from damage due to excessive voltage across its gate and source. Zener diode D2 may not be necessary in order for the circuit to function properly in cases such as (but not limited to): if the source voltage is sufficiently low or transistor Q2 is not a MOSFET.

Diode D3 protects transistor Q3 from damage due to reverse over voltage across its base and emitter. Diode D3 may not be necessary in cases such as (but not limited to): if the source voltage is sufficiently low or transistor Q3 is not a NPN transistor.

Resistor R4 is a pull down for the base-emitter of transistor Q2. It is not needed if diode D3 is not used.

Resistor R2 is a pull-up resistor for transistor Q3. It feeds current to the base of transistor Q3 when current limiting function is disabled. Q4 is on to disable current limiting.

Resistor R3 is a pull down resistor for transistor Q2.

Capacitor 16-1 is illustrated as a single capacitor. Those of skill will understand that it represents all of the capacitances of the device or strobe.

It should be noted that while the above describes a fire alarm strobe application, the same type of circuitry could also be used for a fire alarm sounder application or any other application where in-rush current control is needed, inside or outside the fire protection industry. The particular type of application is not a limitation of the invention.

Figure 7:
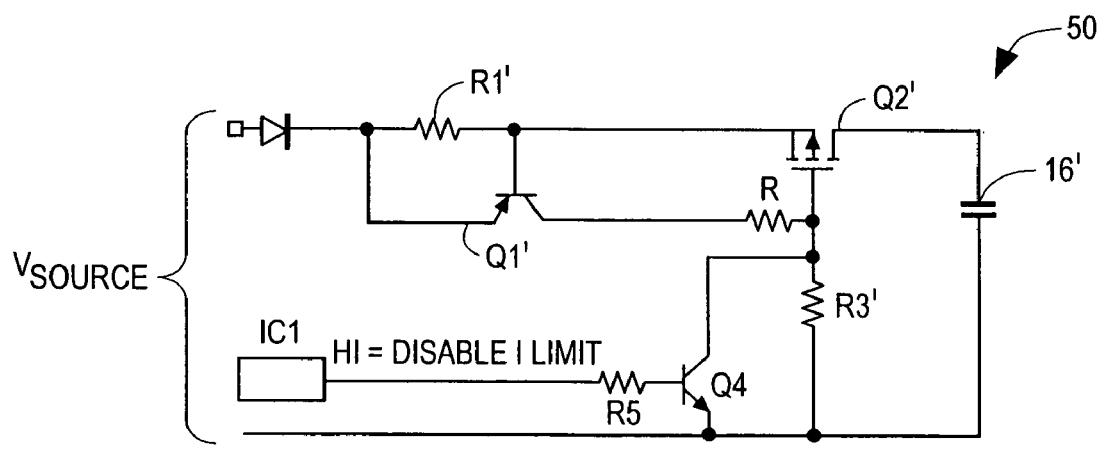
FIG. 7 is yet another alternate embodiment of the current limiter of FIG. 5.

FIG. 7 illustrates another embodiment of a current limiting circuit 50 in accordance with the invention. In the circuit 50, transistor Q3 of FIG. 5 has been replaced with fixed resistor R.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A current limiting circuit comprising:
   an input terminal;
   a current sensing resistor having first and second ends;
   a current sensing transistor;
   a load current limiting semiconductor switch with a current input, a current output and a control input;
   a capacitive load periodically discharged through an external electrical device; and
   timer circuits with an interval ending output signal said timer circuits timing an interval after discharge of the capacitive load and providing the interval ending output signal but only after a predetermined time interval after each periodic discharge;
   where the input terminal is connected to one end of the resistor, the other end of the resistor is connected to the current input of the load current limiting semiconductor switch, the current sensing transistor is connected across the resistor and is coupled to the control input of the load current limiting semiconductor switch and periodically biases that switch to a lower conductivity state in response to a periodically increasing current through the resistor that crosses a predetermined threshold, the capacitive load is connected to the current output of the load current limiting semiconductor switch and is periodically discharged, the load current limiting semiconductor switch remains in the lower conductivity state providing a first current for the capacitive load until the interval ending output signal exhibits a selected state, the load current limiting semiconductor switch then switches to a higher conducting state to charge the capacitive load with a second, higher, current.

2. A current limiting circuit as in claim 1 wherein the capacitive load is coupled to a strobe-type output device.

3. A current limiting circuit as in claim 1 wherein repetitive peak current values are limited and are periodic.

4. A current limiting circuit as in claim 1 wherein current flowing through the circuit to the load passes through the circuit both when the current limiting switch is in the lower conductivity state and when the current limiting switch is not in the lower conductivity state.

5. A method of repetitively charging a capacitor that is periodically discharged comprising:
   a) sensing a charging current amplitude;
   b) comparing the current amplitude to a predetermined threshold;
   c) responsive to the current amplitude exceeding the threshold, biasing a semiconductor switch to a high impedance state and thereby limiting maximum current amplitude through the semiconductor switch while continuing to charge the capacitor with a first current;
   d) after a predetermined time interval first following each periodic discharge, generating a time-based signal and responsive thereto, biasing the semiconductor switch to a lower impedance state and continuing to charge the capacitor with a higher amplitude current than the first current flowing through the semiconductor switch; and
   e) discharging the capacitor and returning to a) above.

6. A method as in claim 5 which includes in d) periodically generating a time-based signal.

7. A method as in claim 6 which includes setting a visible output light parameter associated with the capacitor.

* * * * *